(No Model.)

A. F. CUSHMAN.
LATHE CHUCK.

No. 371,926. Patented Oct. 25, 1887.

Witnesses
James F. Duhamel
Walter S. Dodge

A. F. Cushman,
Inventor:
By his Attorneys, Dodge & Son.

UNITED STATES PATENT OFFICE.

AUSTIN F. CUSHMAN, OF HARTFORD, CONNECTICUT.

LATHE-CHUCK.

SPECIFICATION forming part of Letters Patent No. 371,926, dated October 25, 1887.

Application filed May 13, 1887. Serial No. 238,126. (No model.)

*To all whom it may concern:*

Be it known that I, AUSTIN F. CUSHMAN, of Hartford, in the county of Hartford and State of Connecticut, have invented certain new and useful Improvements in Lathe-Chucks, of which the following is a specification.

My invention relates to lathe-chucks; and it consists in various features and details hereinafter set forth and claimed.

Figure 1:
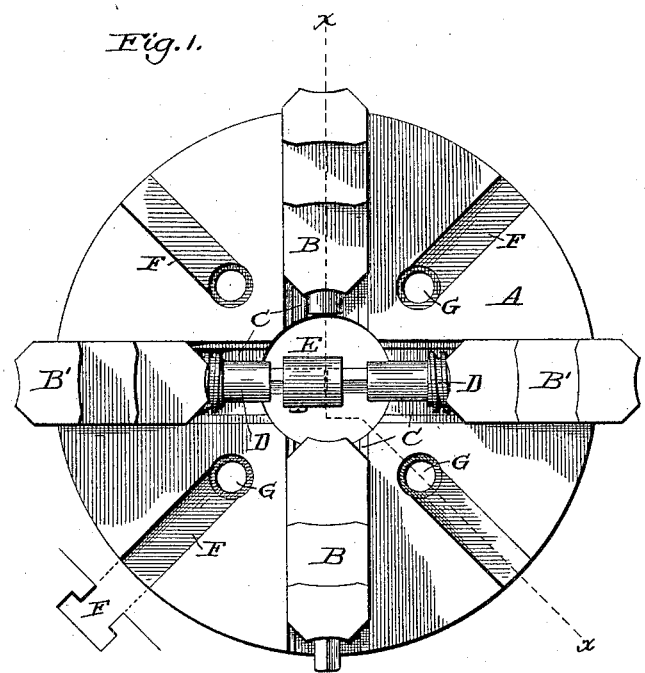
Figure 2:
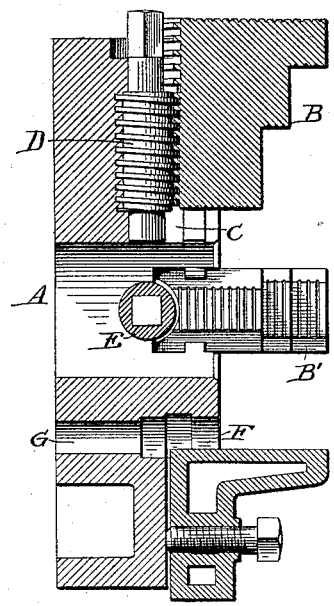

In the drawings, Figure 1 is a face view of a chuck constructed in accordance with my invention. Fig. 2 is a vertical sectional view on the line $xx$ of Fig. 1, and Fig. 3 a detail view.

The object of this invention is to so construct the chuck that its jaws may be operated independently of each other, and the two opposing jaws of a pair may be operated independently or simultaneously.

Another object of the invention is to so construct the body of the chuck as to permit the application of special work and tool holding devices which shall act in conjunction with or in addition to the jaws, and thereby firmly hold the work in place.

Referring again to the drawings, A indicates the body of the chuck as a whole, which is provided with a series of jaws, B B and B' B', which slide in radial grooves or ways C, formed in the body of the chuck, as is usual in this class of devices, the sides of the jaws and of the ways or grooves being tongued and grooved, as shown in Fig. 2.

In order that the jaws may be moved inward and outward in their slots or ways C, I provide each jaw with a short worm or screw, D, as shown in Fig. 2, said worm having cylindrical end journals and being furnished at its outer end with a polygonal or angular head adapted to receive a wrench. These worms or screws D are journaled in semicircular seats or sockets formed in the body of the chuck and engage with the threaded under faces of the jaws, as shown in Fig. 2. This construction of the chuck is common and well known and needs no further description.

Figure 3:
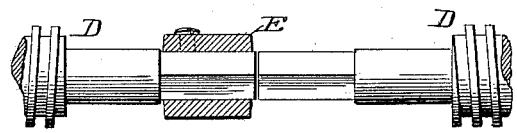

In order that the two jaws B B or B' B' of either pair may be operated simultaneously, the inner ends of the worms or screws D are extended inwardly toward each other, and will be preferably squared, as shown in Figs. 1 and 3, and mounted and free to slide upon the proximate ends is a collar or sleeve, E. When the collar E is in the position shown in Fig. 1, it will connect the inner ends of the worms that operate the jaws B' B', and it will be seen that by turning the worm or screw of either of these jaws a corresponding rotation will be given to the worm of the other jaw.

If it should be desired to adjust or move either of the jaws B' B' independently of the other, the collar E will be slid back upon the angular shank of one of the worms until it becomes disconnected from the shaft or shank of the other worm, as shown in Fig. 3.

If necessary, the collar E may be provided with a set-screw, as shown in Figs. 1 and 3, by which it may be retained in either of its positions, though this is not essential. In the outer face of the chuck between the jaws is a series of radial slots, F, which, as shown in Fig. 1, will preferably be made T-shaped in cross-section, and at the inner ends of said slots holes or openings G extend through the chuck from front to rear parallel with the axis of the chuck to receive screws or bolts by which to fasten the chuck-body to a face-plate.

It often becomes necessary in turning special work to provide means for holding irregular work upon the chuck, because of the impossibility of properly holding the same by means of the jaws, and it will be seen that by providing the chuck with the series of radial slots F, I am enabled to apply to said chuck a series of special work-holding jaws, clamps, or devices, which will be retained in their proper places through the aid of bolts or other fastenings.

It is obvious that instead of making the worms that operate the jaws B' B' separate, and connecting them by means of a collar, in some cases it may be found desirable to use a solid shaft having at opposite ends a worm or screw; but I prefer the arrangement shown and described.

Unless one shaft be placed back of the other and the jaws and their grooves or seats be made proportionately deeper, it is obvious that only one screw or worm spindle could be thus made to extend through from side to side, and such difference in the jaws is undesirable.

I am aware that a chuck has been patented in which the separate jaws were adapted to be operated by means of independent worms, which latter were adapted to be connected in pairs and operated simultaneously by means of a key, and to such construction I lay no claim.

Having thus described my invention, what I claim is—

1. In combination with a chuck provided with a series of radial ways and a series of jaws mounted in said ways, independent worms or screws journaled in the chuck and engaging with their respective jaws, and a connecting device, substantially such as shown, mounted within the chuck, adapted to couple and uncouple the worms of opposing jaws.

2. In combination with chuck A, provided with ways or guides C, jaws B B', mounted in said ways or guides, worms or screws D, journaled in the body of the chuck and engaging with the jaws B B', and a collar, E, adapted to connect the worms of the jaws B', substantially as shown.

3. In combination with a chuck provided with a series of radial grooves, a series of jaws, B B B' B', mounted in said grooves, separate worms or screws D for each of the jaws B B, and a shaft provided with right and left threads mounted in the body of the chuck and adapted to operate the jaws B' B' simultaneously.

4. In combination with a chuck provided with a series of radially-moving jaws, a series of radial slots, as F, in the outer face of the chuck between the jaws, and a series of work-holding devices mounted in said slots, all substantially as and for the purpose set forth.

In witness whereof I hereunto set my hand in the presence of two witnesses.

AUSTIN F. CUSHMAN.

Witnesses:
E. L. CUSHMAN,
A. S. BELDEN.